United States Patent [19]

Poncy

[11] Patent Number: 5,052,631
[45] Date of Patent: Oct. 1, 1991

[54] PEPPERMILL TREE

[76] Inventor: George W. Poncy, 3725 Investment La., Riviera Beach, Fla. 33404

[21] Appl. No.: 88,254

[22] Filed: Aug. 24, 1987

[51] Int. Cl.[5] .......................................... A47J 42/04
[52] U.S. Cl. .................................................. 241/169.1
[58] Field of Search ........................... 222/142.1–142.9; 241/168, 169, 169.1, 169.2, 285 R, 257 R, 258

[56] References Cited

U.S. PATENT DOCUMENTS

| | | | |
|---|---|---|---|
| 2,514,416 | 7/1950 | Plunkett | 222/142.9 X |
| 2,782,998 | 2/1957 | Hastings | 241/169.1 |
| 3,633,834 | 1/1972 | Nissen | 241/169.1 |
| 3,991,947 | 11/1076 | Schlessel | 241/169.1 |

FOREIGN PATENT DOCUMENTS 1165214  3/1964  Fed. Rep. of Germany .

*Primary Examiner*—Mark Rosenbaum
*Attorney, Agent, or Firm*—Lane, Aitken & McCann

[57] ABSTRACT

A peppermill includes an outer casing receiving a disposable cartridge containing a supply of peppercorns to be ground in order to dispense fresh pepper. Legs project radially from the grinding end of the cartridge into blind slots on an interior surface at a corresponding end of the casing. A cartridge cap operatively connected to a grinding element at the bottom of the bottom of the cartridge includes a dovetail shape for receiving a connector member, and the connector member includes an upstanding rim having ribs engaging slots on a depending skirt of a cap so that rotation of the cap causes rotation of the grinding element. A notch is provided in an upper rim of the casing body to permit a depending dovetail bar on the connector member to be slid into the dovetail slot of the cap when the cartridge is raised slightly from its normal operative position. Clearance is provided between an upper surface of the legs projecting radially from the cartridge and a shoulder at the closed end of the blind slots to permit the cartridge to be raised relative to the casing body. The lowering of the cartridge to its operational position results in the notch, and the rest of the upper rim of the casing body locking the dovetail bar in the dovetail groove. An extension member having ribs and grooves for mating with the knob and the connector member, respectively, may be inserted between the knob and the connector member to extend the length of the peppermill.

16 Claims, 3 Drawing Sheets

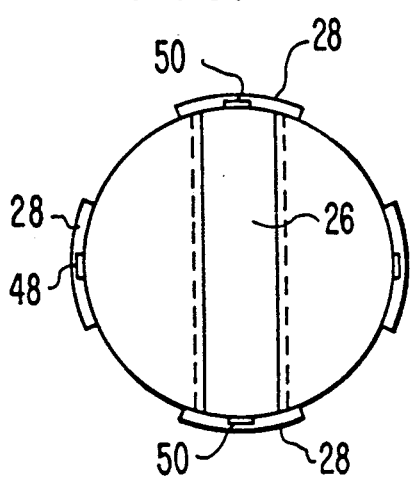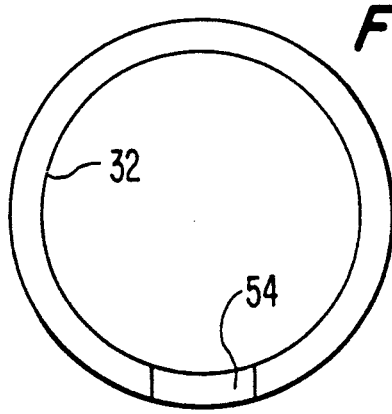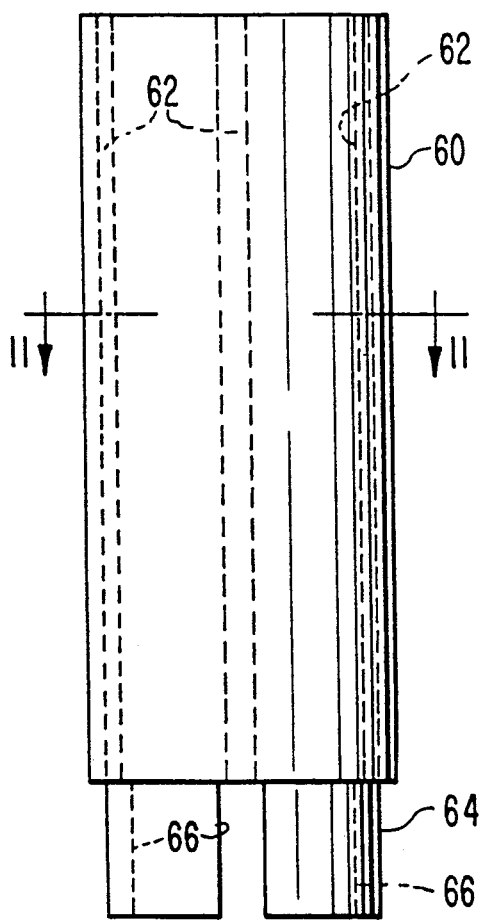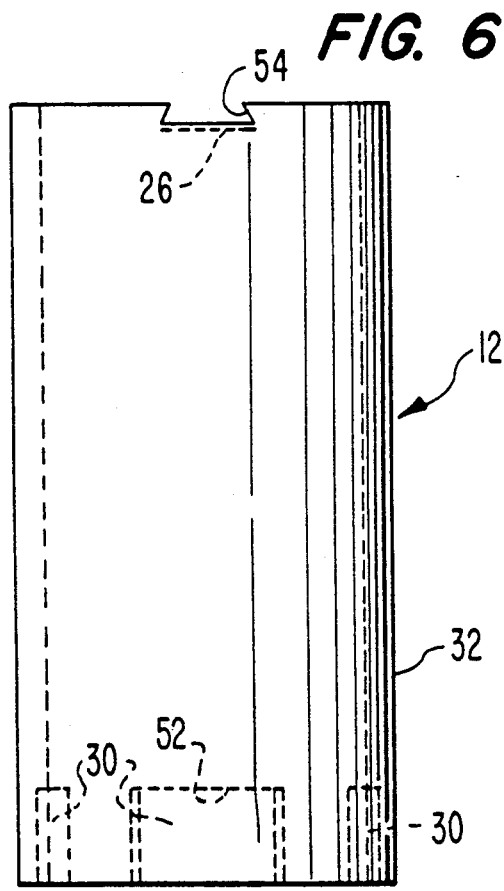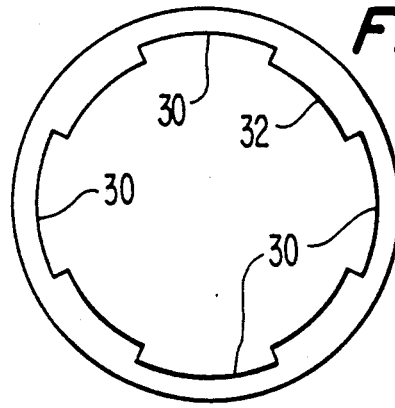

PEPPERMILL TREE

BACKGROUND OF THE INVENTION

The present invention relates to food grinding devices and, more particularly, to large peppermills of the type commonly used in restaurants.

In restaurants, it is customary for the waiter to dispense freshly ground pepper from a large peppermill on the order of 10 inches to as much as 24 inches long, which enables the waiter to center the working end of the peppermill over the center of the food to be seasoned, without reaching unduly over the food or over the patrons seated at a table. Conventional restaurant peppermills have several disadvantages. Peppermills which are in constant use require frequent refilling with peppercorn kernels, a chore which is disdained by waiters and busboys alike. Pouring the peppercorn kernels from a container into the comparatively narrow orifice provided in the peppermill often results in kernels being spilled onto the floor, which not only results in waste, but also requires cleanup. Furthermore, constant use of the peppermills results in clogging of the grinding surfaces in the peppermills, which impairs performance and requires disassembly of the peppermills for wire brushing and cleaning. Taking a peppermill apart and putting it back together again requires some skill, in addition to tools such as screwdrivers. Sometimes, both a Philips type screw and a slotted screw are used by a peppermill manufacturer. In addition to all of the foregoing is the need to replace the entire peppermill because repeated use has deteriorated the grinding surfaces beyond use even though most of the peppermill is in good-as-new condition.

Faced with the foregoing obstacles, many restaurant proprietors end up with a number of peppermills which simply languish in the kitchen either worn out or in need of refilling or cleaning. Since they need operating peppermills, the proprietors often resort to the quick, though expensive, remedy of simply buying additional peppermills.

Although the problems described above pertain especially to the large peppermills used by waiters in restaurants, many of the same problems, such as the disassembly, filling, spilling and deterioration apply as well to smaller peppermills, such as those used in the home and those which might be provided on each table in a restaurant.

SUMMARY OF THE PRESENT INVENTION

To overcome the drawbacks of conventional peppermills, a peppermill tree is designed in accordance with the present invention and as such serves as a casing which cooperates with a disposable peppermill, said disposable peppermill being disclosed in the applicant's copending application Ser. No. 038,648 which was filed on Apr. 15, 1987; said disposable peppermill now having several appurtenances put thereupon for purposes which will be disclosed; and further, to differentiate between the applicant's prior disposable peppermill and that which is being disclosed herein, the present disclosure is hereafter referred to as the peppermill cartridge, or simply the cartridge. Accordingly, the cartridge, fully loaded with peppercorns, is inserted into the peppermill tree after which the peppermill tree can be worked as any conventional peppermill; said peppermill tree having been loaded without the problems heretofore noted, i.e., spilling, disassembling and cleaning and re-assembling. Because each cartridge is a complete mill unto itself, sharp new grinding surfaces are brought to bear upon the peppercorns with each cartridge insertion.

While the design of the peppermill tree and the cartridge may vary in a multitude of ways, the functions for which mechanical appurtenances must be provided are these:

Since rotation of the grinding surfaces is needed to pulverize the peppercorns within, (as with conventional peppermills), the peppermill tree comprises a lower section and an associated upper element rotatable relative to the lower section when the lower section is held stationary.

Since the cartridge is fully inserted onto the lower section of the peppermill tree and thus cannot be worked by direct contact, it is necessary to provide some connecting arrangement within the peppermill tree whereby the cap portion of the cartridge can be rotated so as to pulverize the peppercorns within the cartridge. Further, some mechanism must be provided within the peppermill tree which will maintain the lower portion of the cartridge in a stationary position against the rotating force taken upon the cartridge cap. This may be accomplished by designing the shape of the rotatable lower half of the cartridge so that the sides or a portion of same may be flat instead of cylindrical, (e.g. a square or rectangular shape) with complementarilly-shaped inner walls for the peppermill tree. At any rate, complementary means must be provided upon the cartridge which will co-act with those provided within the peppermill tree so as to maintain the cartridge in its proper relationship with the peppermill tree.

The following description and specification are illustrative of a preferred embodiment of the invention as it is concerned with both the peppermill tree and the peppermill cartridge.

The cartridge is cylindrical in shape and includes a body having interior grinding surfaces and a cap rotatable relative to the body. The cap is connected to a bottom member defining the bottom of the cartridge and having grinding surfaces cooperating with the interior grinding surfaces on the body so that rotation of the cap relative to the body causes the grinding of peppercorns and dispensing of pepper. The body has radially projecting legs which are received in blind slots defined on an interior surface at the lower end of a body of a casing of the peppermill. The casing, or peppermill tree, also includes a connector member or stem having a depending bar or ridge, dovetail-shaped in cross section, which slides into a dovetail-shaped groove or slot in the cap of the cartridge, so that the cap of the cartridge rotates with the connector member. The connector member has a portion overlying the body of the casing, and includes vertical ribs which fit into mating slots on a knob so that rotation of the knob causes rotation of the connecting member and, thereby, rotation of the cap of the cartridge.

The body of the casing includes a notch in general alignment with the dovetail shaped groove in the cap of the cartridge, the notch being large enough that the depending dovetail-shaped bar of the connector member can slide therethrough. In the operating position of the peppermill, the bottom surface of the dovetail bar lies slightly below the bottom surface of the notch in the body of the casing so that the removal of the dovetail bar from the dovetail groove and the removal of the cartridge from the casing are both prevented. In order that the dovetail bar may be removed from the dovetail groove in order to permit the change of cartridges, the blind slots on the casing body are made taller than the projecting legs on the cartridge body so that the bottom of the dovetail bar may be raised to a level above the bottom surface of the notch in the casing body, whereby the connector member can be separated from the cartridge and the cartridge can be removed from the casing.

In alternate embodiments of the present invention, an extension member is provided between the connector member or stem and the knob in order to provide a longer peppermill. In another embodiment according to the present invention, the cap of the cartridge has no dovetail groove. Instead, a pair of parallel grooves are defined in the top surface of the cap for receiving depending legs on an adapter member which includes a dovetail groove for receiving the dovetail bar of a connector member in a manner similar to that of the first-described embodiment.

BRIEF DESCRIPTION OF THE DRAWINGS

FIG. 5 is a top plan view of the cartridge of FIG. 4;

FIG. 6 is a front elevation of the casing of FIG. 1;

FIG. 7 is a bottom plan view of the casing of FIG. 6;

FIG. 8 is a top plan view of the casing of FIG. 6;

FIG. 9 is a front elevation of an extension member for use in the peppermill according to the present invention;

DETAILED DESCRIPTION OF THE PREFERRED EMBODIMENTS

Figure 1:
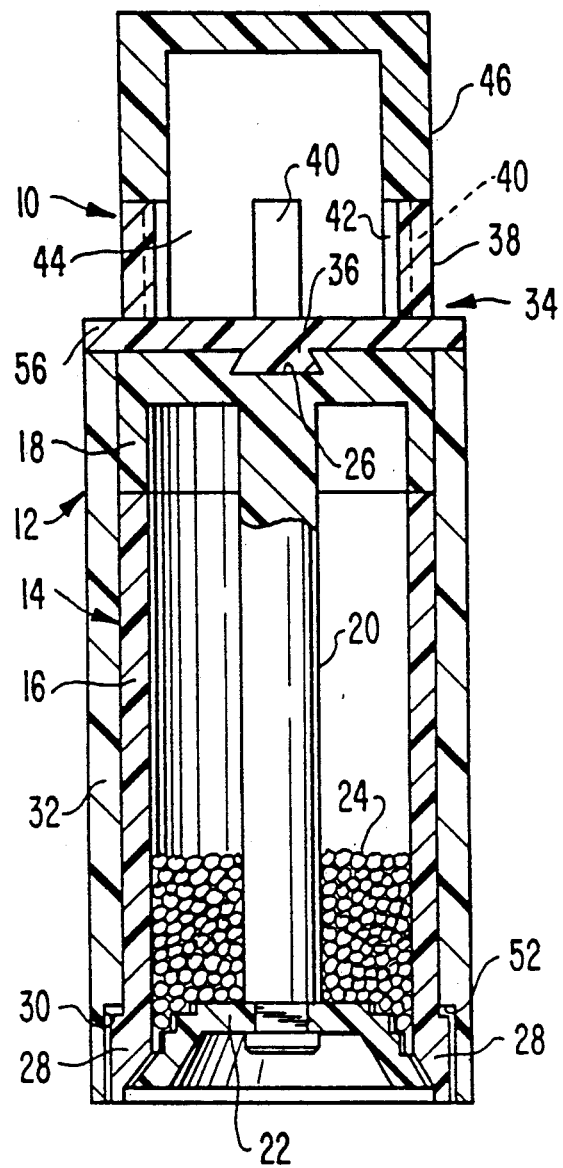
FIG. 1 is a cross section of the peppermill according to the present invention showing the cartridge within the casing.

As can be seen from FIG. 1, the peppermill according to the present invention, which is designated generally by the reference numeral 10, includes a casing 12, or peppermill tree, which is designed to be kept and reused and a cartridge 14, which is disposable. Both the casing 12 and the cartridge 14 are cylindrical in shape, and the cartridge 14 includes a tubular body 16 having open ends and grinding surfaces on the interior of the body 16 at one of the ends. Although the casing 12 described and shown herein is generally cylindrical, a wide variety of designs and configurations are possible, especially when the casing 12 is made from an acrylic resin, such as LUCITE. Of course, the casing can also be made in a more traditional style, using fine woods with appropriate finishes. Because of the need for rigid grinding surfaces, the cartridge 14 is best made from a tough plastic resin, such as a polycarbonate. A cap 18 is positioned at one end of the body 16 for rotation relative to the body and includes a depending shaft 20 connected to a grinding element 22 which closes the end of the body 16 having the grinding surfaces so that a supply of peppercorns 24 can be retained in the cartridge 14. Rotation of the cap 18 relative to the body 16 causes rotation of the grinding element 22 relative to the grinding surfaces on the body 16 so that the peppercorns 24 can be ground and pepper can be dispensed. The structure and operation of the grinding portions of the cartridge 14 are the same as the corresponding portions of the disposable peppermill disclosed in the applicant's copending application, Ser. No. 038,648, which was filed on Apr. 15, 1987.

Figure 2:
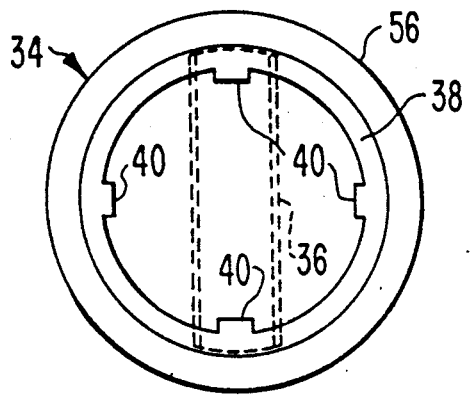
FIG. 2 is a top plan view of the connector member of FIG. 1.
Figure 3:
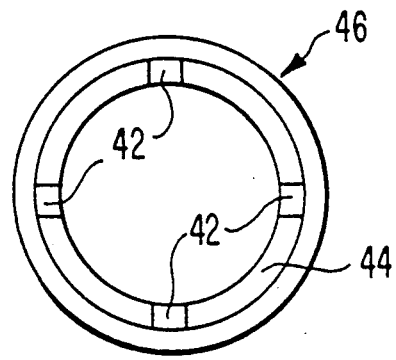
FIG. 3 is a bottom plan view of the knob of FIG. 1.

An open-ended groove 26, dovetail-shaped in cross section and having a bottom and an open top, is defined in the cap 18 across a top surface thereof. A plurality of legs 28 project radially from the end of the cartridge body 16 having the grinding surfaces. The legs 28 are received in blind slots 30, which are defined at one end of a hollow cylindrical body 32 of the casing 12, that end being open to permit the ground pepper to be dispensed. As can best be seen from FIG. 1, the height of the blind slots 30 is slightly greater than the height of the radially extending legs 28, for reasons which will be described later. The opposite end of the casing body 32 is surmounted by a connector member or stem 34 having a depending bar 36 or ridge of dovetail-shaped cross section which mates with the dovetail groove 26 of the cap 18 of the cartridge 14. The dimensions of the dovetail groove are such that the groove provides a slideable fit when the dovetail bar is introduced therein. The connector member 34 includes an upstanding rim 38 defining a plurality of internal axial ribs 40. The ribs 40 are received in slots 42 formed in a skirt 44 depending from a knob 46, which provides a surface suitable for grasping to rotate the cartridge cap 18 relative to the cartridge body 16. The interengagement of the ribs 40 with the slots 42 causes the connector member 34 to move with the knob 46 when the knob is rotated. The interengaging portions of the connector member 34 and the knob 46 are also illustrated in FIGS. 2 and 3.

Figure 4:
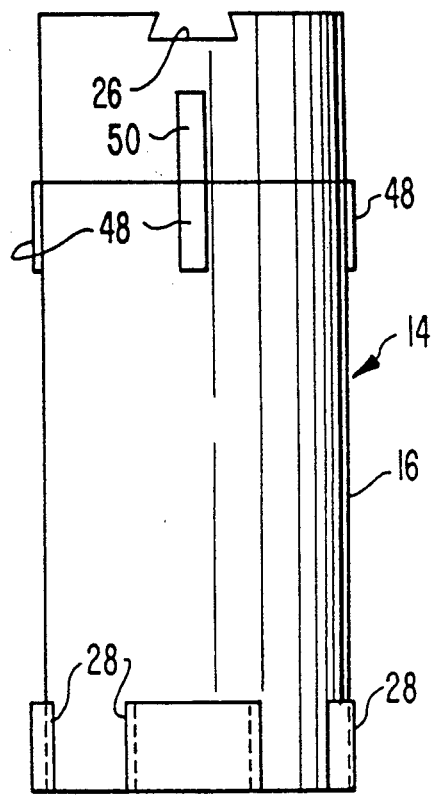
FIG. 4 is a front elevation of the cartridge of FIG. 1.

As can best be seen from FIGS. 4 and 5, four of the radially projecting legs 28 are evenly spaced around an exterior surface at one end of the body 16 of the cartridge 14, each leg 28 having a width just slightly less than the width of a blind slot 30, so that the cartridge body 16 is prevented from rotating relative to the casing body 32. A corresponding number of index ridges 48 are provided at the opposite end of the cartridge body 16 and are centered in alignment with the legs 28. The index ridges 48 are flat, having a thickness on the order of 0.003 inches. A pair of diametrically opposed index ridges 50 are provided on an exterior surface of the cap 18 of the cartridge 14 in vertical alignment with the ends of the dovetail groove 26. Therefore, when the index ridges 50 on the cap 18 are aligned with any two of the index ridges 48 on the cartridge body 16, the ends of the open ended dovetail groove 26 are in alignment with two of the radially projecting legs 28, which is important for the assembly of the peppermill, as will be described hereinafter.

The cylindrical body 32 of the casing 12 is open at opposite ends and is sized to receive the cartridge 14. For example, the inner diameter of the casing 12 can be on the order of 0.010 inches larger than the outer diameter of the cartridge 14. The blind slots 30 are defined in the wall of the casing body 52 in an interior surface thereof, each blind slot 30 having an open end opening at the bottom end of the casing body 32 and a closed, or blind, end defined by a shoulder 52 positioned a predetermined distance above the bottom end of the casing body 32. As can be seen from FIG. 6, a notch extends through the rim of the casing body 32 at the top end of the casing body 32 and is wide enough that the dovetail bar 36 of the connector member 34 can be slid through. In the normal, assembled condition of the peppermill, a bottom surface of the notch 54 is at a level slightly above the bottom surface of the dovetail groove 26, the position of which is shown in dashed lines in FIG. 6, thereby obstructing the groove and preventing access to the groove by the dovetail bar 36. Thus, the upper portion of the casing body 32, including the notch 54, releasably locks the dovetail bar 36 in the dovetail groove 26 after the dovetail bar has been slid into the dovetail groove. In order to permit the dovetail bar 36 to be moved into the dovetail groove 26, the cartridge 14 must be raised relative to the casing to the point where the bottom surface of the notch 54 is flush with the bottom of the dovetail groove 26. In this position, the dovetail bar 36 can be inserted all the way into the dovetail groove 26 until the bar hits the opposite side of the casing 12, where there is no notch in the rim of the casing. In order to permit such raising, the position of the shoulders 52 in the blind slots 30, that is, the height of the blind slots 30 above the bottom end of the casing 12 is sufficiently greater than the height of the radially extending legs 28 to permit the cartridge 14 to be raised enough so that the bottom surface of the notch 54 in the casing body 32 no longer prevents the entry of the dovetail bar 36 into the dovetail groove 26. Thus, the difference in height defines a clearance between the closed end of the slots 30 and adjacent surfaces of the radially projecting legs 28, thereby permitting limited movement of the bottom of the notch 54 relative to the dovetail groove 26. When the cartridge 14 is permitted to descend to its normal, operative position, after the dovetail bar 36 has been inserted into the dovetail groove 26, the bottom surface of the notch 54 again obstructs the dovetail groove 26, thereby preventing the separation of the connector member 34 from the cap 18 of the cartridge 14.

Alignment of the dovetail groove 26 with the notch 54 in the top of the casing body 32 is ensured when the index ridges 50 on the cartridge cap 18 align with any two of the index ridges 48 on the cartridge body 16, since the dovetail groove 26 is aligned with the index ridges 50 on the cartridge cap 18, since each index ridge 48 on the cartridge body 16 is centered over a radially extending leg 28, and since the radially projecting legs 28 are received in the blind slots 30, one of which is aligned with the notch 54 at the opposite end of the casing body 32. As can be appreciated from FIGS. 1, 5 and 7, the reception of the radially projecting legs 28 in the blind slots 30 prevents rotation of the cartridge 14 relative to the casing body 32 and assures that the grinding element 22 rotates relative to the cartridge body 16 when the connector member 34 rotates relative to the casing body 32. In the assembled condition of the peppermill 10, the cartridge 14 is prevented from being lifted out of the casing by the engagement of the radially projecting legs 28 on the cartridge 14 with the shoulders 52 at the closed ends of the blind slots 30 in the casing 12. In addition, the cartridge 14 can only be pushed down until the bottom of the cartridge 14 is in the same plane as the bottom of the casing 12. At that point, a flange 56 (FIG. 1) on the connector member 34 engages the top rim of the casing 12. When the flange 56 is in engagement with the top rim, the bottom surface of the dovetail bar 36 is below the bottom surface of the notch 54 in the rim, and movement of the dovetail bar 36 along its axis is prevented.

Figure 10:
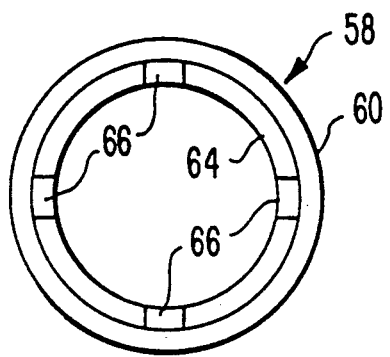
FIG. 10 is a bottom plan view of the extension member of FIG. 9.
Figure 11:
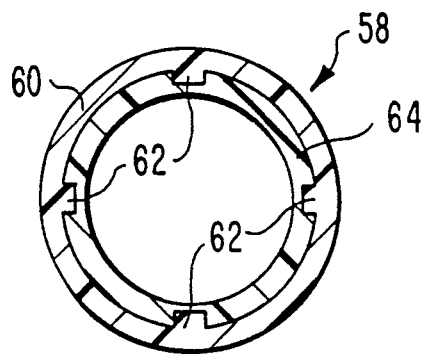
FIG. 11 is a top plan view of the extension member of FIG. 9.
Figure 12:
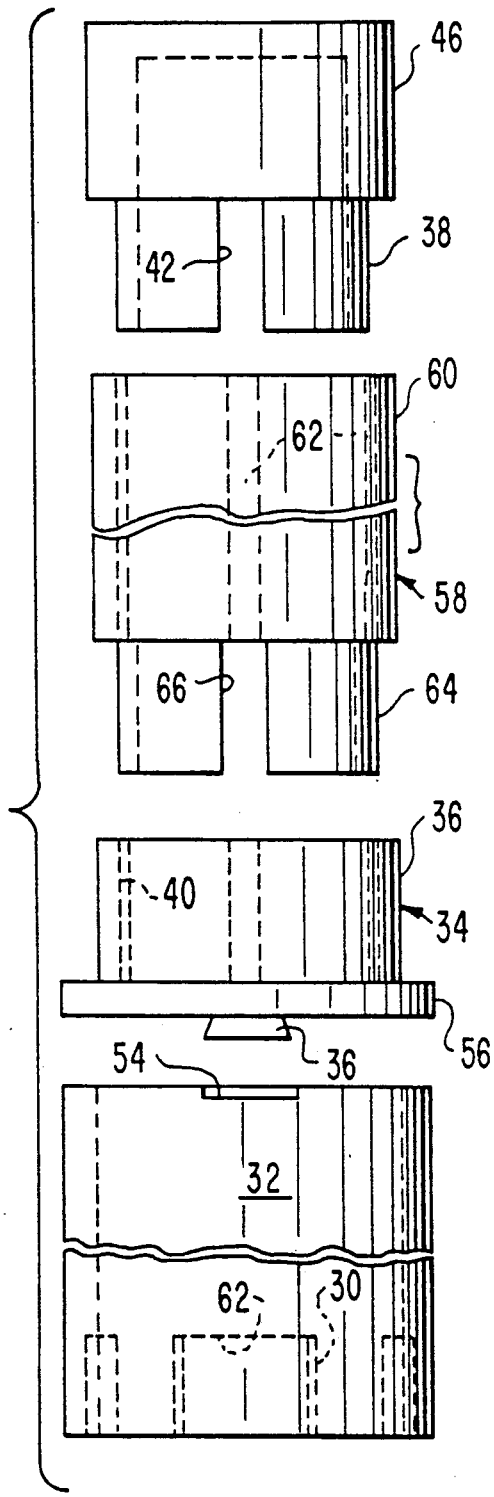
FIG. 12 is an exploded view showing the extension member of FIG. 9 in connection with the peppermill tree.

The peppermill 10 described thus far and illustrated in FIGS. 1-8 is especially well suited for the relatively small sizes of peppermills common in domestic use and for placement on restaurant tables. However, the peppermill 10, according to the present invention, can be made longer for commercial or restaurant use and especially for use by a waiter by inserting an extension member 58, which can be seen from FIGS. 9-11. The extension member 58 includes a cylindrical trunk portion 60 having the same diameter as the upstanding rim 38 on the connector member 34 and a height equal to the desired increase in length of the peppermill 10. Internal axial ribs 62 corresponding to the internal axial ribs 40 on the upstanding rim 38 are provided so that they may interengage with the slots 42 on the depending skirt 44 of the knob 46. The extension member 58 includes its own skirt 64 which corresponds in shape and dimension to the skirt 44 of the knob 46, including slots 66 which receive the internal axial ribs 40 of the upstanding rim 38 on the connector member 34. As can best be seen from FIG. 12, the interengagement of the extension member 58 at one end with the upstanding rim 38 of the connector member 34 and at the other end with the depending skirt 44 of the knob 46 permits the length of the peppermill 10 to be increased while maintaining operational engagement between the knob 46 and the connector member 34, whereby the cartridge 14 may be operated and freshly ground pepper dispensed. Because of the configurations and dimensions of the trunk portion 60 and the skirt 64, a plurality of extension members 58 can be stacked on one another to extend the length of the peppermill 10, instead of employing a single extension member.

Figure 13:
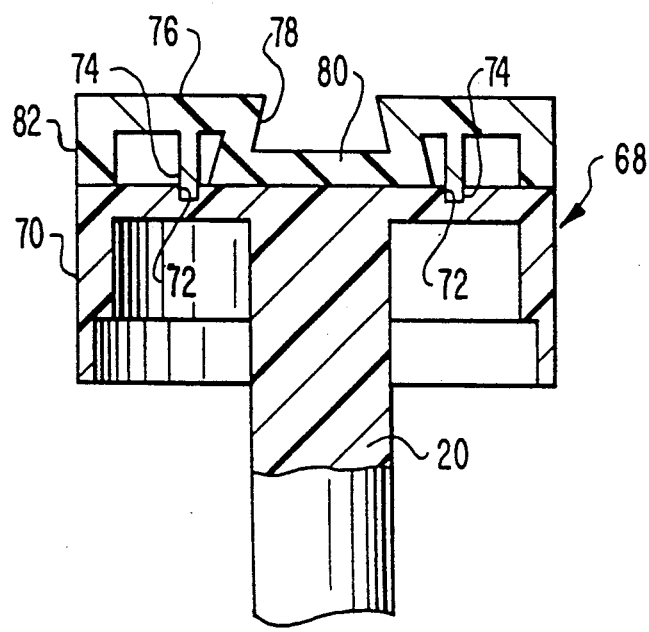
FIG. 13 is a cross section of an alternate cartridge cap for use in the peppermill tree according to the present invention.

In the embodiment depicted in FIG. 1, the cap 18 of the cartridge 14 is illustrated as a single piece in which a dovetail groove is formed. As an alternative, which is illustrated in FIG. 13, a cartridge cap 68 may be employed which includes a cylindrical base element 70 having an upper surface which is planar except for a pair of parallel grooves 72 which are formed chordally in the upper surface. The grooves 72 receive depending prongs 74 of an adapter member 76 which has defined therein an open ended slot 78 of dovetail cross section for receiving the dovetail bar 36 of the connector member 34. The adapter member 76 includes a central portion 80 which defines the open ended slot and a depending flange 82 which is flush with a bottom surface of the central portion. The prongs 74 project below the bottom surface of the central portion 80 and the flange 82 so as to extend into the parallel grooves 72 when the bottom surface and the flange contact the planar upper surface of the base element 70. The prongs 74 are permanently cemented in place in the grooves 72.

Although the term "peppermill" has been used throughout in connection with the device according to the present invention, it is understood that, aside from other condiments, cheeses, such as parmesan, and other foodstuffs, can be ground in and dispensed from the device according to the present invention. It will be apparent that other additions and modifications can be made without departing from the spirit and scope of the present invention, which is not limited to the specific embodiments described herein, but determined by the appended claims.

I claim:

1. A food grinder comprising:
an elongate casing; and
a disposable cartridge removably mounted in said casing, said cartridge being adapted to hold a supply of food to be ground and dispensed;
said cartridge including a body, a cap rotatably mounted relative to said body, and means for grinding the food, said cap being operatively connected to said grinding means;
said casing including a body and a stem rotatably mounted relative to said casing body;
means for preventing rotation of said cartridge body relative to said casing body, and
means for connecting said stem to said cap of said cartridge.

2. A food grinder as recited in claim 1, wherein said connecting means comprises a groove defined in said cap of said cartridge and a bar depending from said connector member, said bar being positioned in said groove.

3. A food grinder as recited in claim 2, wherein said groove has a bottom, an open top, at least one open end and sides which converge from said bottom to said top, and said bar has diverging sides complementary to the converging sides of the groove, whereby said bar can be slid into said groove and held fixed against movement relative to said cap of said cartridge in a direction transverse to the direction of sliding.

4. A food grinder as recited in claim 3, wherein said groove and said bar have in cross section the shape of a dovetail.

5. A food grinder as recited in claim 3, further comprising means for locking said bar in said groove.

6. A food grinder as recited in claim 5, wherein said locking means comprises a portion of said casing body obstructing said open end of said groove.

7. A food grinder as recited in claim 6, wherein said locking means further comprises a notch in a rim on an end of said casing body adjacent to said cap of said cartridge, said notch including a bottom having a width greater than the width of said ridge, and means for permitting limited movement of the bottom of said notch relative to said groove between a first position, in which the bottom of said notch is above the bottom of said groove, and a second position, in which the bottom of said notch is flush with the bottom of said groove.

8. A food grinder as recited in claim 7, wherein said means for preventing rotation of said cartridge body relative to said casing body comprises at least one slot in said casing body at an end of said casing body distal to said cap of said cartridge, said slot having an open end at said casing end of said casing body and a closed end opposite to said open end, and at least one element projecting radially from said cartridge body and positioned in said slot, and said means for permitting movement comprises clearance between the closed end of said slot and an adjacent surface of said radially projecting element.

9. A food grinder as recited in claim 8, wherein said notch is in alignment with said slot in said casing body in an axial direction with respect to said casing body, said food grinder further comprising a first index mark on the body of said cartridge at an end of the casing body adjacent to the cap of said cartridge, said index mark being in alignment with said radially projecting element in an axial direction with respect to said cartridge, and a second index mark on the cap of said cartridge in alignment with an open end of said groove in an axial direction with respect to said cartridge, whereby alignment of said first index mark with said second index mark results in registration of the open end of said groove with said notch.

10. A food grinder as recited in claim 2, further comprising means for locking said bar in said groove.

11. A food grinder as recited in claim 1, wherein said means for preventing rotation of said cartridge body relative to said casing body comprises at least one slot in said casing body at an end of said casing body distal to said cap of said cartridge, said slot having an open end at said distal end of said casing body and a closed end opposite to said open end, and at least one element projecting radially from said cartridge body and positioned in said slot.

12. A food grinder as recited in claim 1, further comprising a knob connected to said stem.

13. A food grinder as recited in claim 12, wherein said stem includes an upstanding rim and at least one rib defined axially on said upstanding rim, and said knob includes a depending skirt defining at least one slot, the rib on said upstanding rim being positioned in the slot on said depending skirt, whereby said stem rotates when said knob is rotated.

14. A food grinder as recited in claim 12, further comprising an elongate extension member positioned between said stem and said knob.

15. A food grinder as recited in claim 13, further comprising an elongate extension member positioned between said stem and said knob, said extension member having a depending skirt defining at least one slot engaging the rib on said upstanding rim, said extension member also having a rim and at least one rib defined axially on said rim of said extension member and engaged with the slot on the depending skirt of the knob, whereby said stem rotates when said knob is rotated.

16. A food grinder as recited in claim 1, wherein said cap of said cartridge includes a base member having a surface and at least one groove defined in said surface, and an adapter member mounted on said base member and having at least one prong projecting into said groove of said base member, said adapter member further including a groove defined in a surface on a side of said adapter member opposite to said prong, and said stem includes a depending bar, said bar being positioned in the groove of said adapter member.

* * * * *